United States Patent
Gaudino et al.

(10) Patent No.: US 10,128,973 B2
(45) Date of Patent: Nov. 13, 2018

(54) ACTIVATION OF AN OPTICAL NETWORK UNIT IN A MULTI-WAVELENGTH PASSIVE OPTICAL NETWORK

(71) Applicants: TELECOM ITALIA S.p.A., Milan (IT); POLITECNICO DI TORINO, Turin (IT)

(72) Inventors: Roberto Gaudino, Turin (IT); Valter Ferrero, Turin (IT); Roberto Mercinelli, Turin (IT); Maurizio Valvo, Turin (IT)

(73) Assignees: TELECOM ITALIA S.p.A., Milan (IT); POLITECNICO DI TORINO, Turin (IT)

(*) Notice: Subject to any disclaimer, the term of this patent is extended or adjusted under 35 U.S.C. 154(b) by 12 days.

(21) Appl. No.: 15/507,272

(22) PCT Filed: Sep. 2, 2014

(86) PCT No.: PCT/EP2014/068573
§ 371 (c)(1),
(2) Date: Feb. 28, 2017

(87) PCT Pub. No.: WO2016/034207
PCT Pub. Date: Mar. 10, 2016

(65) Prior Publication Data
US 2017/0288804 A1    Oct. 5, 2017

(51) Int. Cl.
*H04J 14/00* (2006.01)
*H04J 14/02* (2006.01)
*H04B 10/272* (2013.01)

(52) U.S. Cl.
CPC ........ *H04J 14/0282* (2013.01); *H04B 10/272* (2013.01); *H04J 14/0227* (2013.01); *H04J 14/0252* (2013.01)

(58) Field of Classification Search
CPC ............. H04J 14/0282; H04J 14/0252; H04J 14/0245; H04J 14/0227; H04J 14/0256; H04B 10/272
(Continued)

(56) References Cited

U.S. PATENT DOCUMENTS 7,873,277 B2 * 1/2011 Kazawa ............... H04J 14/025
398/68
2007/0092256 A1 * 4/2007 Nozue ................ H04J 14/0282
398/72

(Continued)

FOREIGN PATENT DOCUMENTS

| EP | 0 585 087 A1 | 8/1993 |
| EP | 0 616 443 A2 | 9/1994 |
| EP | 0 840 963 B1 | 9/2000 |

OTHER PUBLICATIONS

International Search Report dated Mar. 18, 2015, in PCT/EP2014/068573, filed Sep. 2, 2014.
(Continued)

*Primary Examiner* — Hanh Phan
(74) *Attorney, Agent, or Firm* — Oblon, McClelland, Maier & Neustadt, L.L.P.

(57) ABSTRACT

A method for activating an ONU in a multi-wavelength PON. Other ONUs may be already active and transmit upstream signals to the OLT on various upstream channels. The new ONU transmits an activation signal superimposed to such upstream signals. Since the ONU may include an uncalibrated tunable transmitter, initially the activation signal wavelength might be different from that upon which the ONU shall be activated. The activation signal optical power is lower than the other upstream signals, so as not to impair their reception at the OLT. The OLT operates the ONUs already active on the upstream channel on which the new ONU shall be activated to suspend transmission for one or
(Continued)

more time gaps, during which the OLT detects the activation signal. This improves activation signal detection conditions, thereby allowing to increase its bitrate. An acceptable duration of the activation procedure can then be achieved.

20 Claims, 5 Drawing Sheets

(58) Field of Classification Search
USPC ........ 398/66, 67, 68, 69, 70, 71, 72, 79, 98, 398/99, 100, 33, 38, 158, 159, 34; 370/352, 392, 389, 468, 465
See application file for complete search history.

(56) References Cited

U.S. PATENT DOCUMENTS

| | | | |
|---|---|---|---|
| 2013/0259482 A1 | 10/2013 | Sarashina | |
| 2014/0126910 A1* | 5/2014 | Luo | H04Q 11/0067 398/67 |
| 2014/0233944 A1 | 8/2014 | Vetter et al. | |

OTHER PUBLICATIONS

Pohlmann et al., "Low Cost TWDM by Wavelength-Set Division Multiplexing", Bell Labs Technical Journal, vol. 18, No. 3, 2013, p. 173-193, XP 011569579.

International Telecommunication Union, "Gigabit-capable passive optical networks (G-PON): transmission convergence layer specification", Recommendation ITU-T G.984.3, Jan. 2014, 168 pages, XP 044008605.

International Telecommunication Union, "Optical system design and engineering considerations", ITU-T Series G Supplement 39, Sep. 2012, 115 pages.

International Telecommunication Union, "40-Gigabit-capable passive optical networks (NG-PON2): General requirements", Recomendation ITU-T G.989.1, Mar. 2013, 24 pages.

International Telecommunication Union, "10-Gigabit-capable passive optical networks (XG-PON): Transmission convergence (TC) layer specification", Recommendation ITU-T G.987.3, Jan. 2014, 143 pages.

* cited by examiner

ACTIVATION OF AN OPTICAL NETWORK UNIT IN A MULTI-WAVELENGTH PASSIVE OPTICAL NETWORK

TECHNICAL FIELD

The present invention relates to the field of optical access networks. In particular, the present invention relates to a method for activating an ONU (Optical Network Unit) in a multi-wavelength PON (Passive Optical Network) and to a multi-wavelength PON configured to implement such a method.

BACKGROUND ART

As known, optical access networks provide end users with access to several broadband services, such as for instance Internet access, video-on-demand, telephone services, etc.

Among the known optical access networks, passive optical networks (briefly termed PON) are becoming even more widespread. Typically, a PON comprises an OLT (Optical Line Termination) and an ODN (Optical Distribution Network) connected thereto. The ODN comprises optical links and optical splitters (with typical splitting ratio of 1:32 or 1:64) arranged according to a tree topology. The tree root is connected to the OLT, while each tree branch may be terminated by a respective ONU (Optical Termination Unit), to which an end user is connected.

The OLT typically transmits downstream traffic addressed to the various ONUs in the form of optical signals having a certain downstream wavelength, while the ONUs typically transmit upstream traffic addressed to the OLT in the form of optical signals having a certain upstream wavelength different from the downstream wavelength. The downstream optical signals addressed to the various ONUs are multiplexed according to the TDM (Time Division Multiplexing) technique, while the various ONUs access the ODN for transmitting the respective upstream optical signals using a TDMA (Time Division Multiple Access) technique. Hence, downstream traffic and upstream traffic basically are in the form of a sequence of downstream frames and a sequence of upstream frames, respectively. Each frame is divided in timeslots, and each timeslot carries an optical signal addressed to or transmitted by a certain ONU.

Use of TDM/TDMA allows preventing collisions between optical signals addressed to or transmitted by the various ONUs. In order to enable a proper functioning of TDM/TDMA mechanism, the ONUs of a PON shall be subjected to an activation procedure by the OLT, before they enter their normal operational state.

In particular, the ONU activation procedure as defined by the ITU-T Recommendations G.984.3 (January 2014) sec. 10 (for GPON systems) and G.987.3 (January 2014) sec. 12 (for XG-PON systems) basically comprises three phases. During a first phase, the ONU under activation recovers the receiving clock from the OLT and synchronizes to the downstream frames. During a second phase, the ONU under activation sends to the OLT a unique identifier (e.g. its serial number) allowing the OLT to uniquely identify the ONU. During a third phase (also termed "ranging phase"), the OLT estimates the round-trip delay between itself and the ONU to be activated. This latter phase allows the OLT calculating an equalization delay to be assigned to the ONU, so as to synchronize it to the other ONUs of the PON. The second and third phases of the activation procedure are performed during a so-called "ranging window", namely a period during which transmission of upstream optical signals from the already active ONUs is temporarily suspended. In order to prevent collisions, the duration $T_{ranging}$ of the ranging window shall be higher than a round-trip delay, which for a typical 20 km ODN is about 200 Hence $T_{ranging}$ is typically longer than the upstream frame period $T_{frame}$, which is equal to 125 µs for GPON and XG-PON systems.

EP 0 616 443 describes a ranging procedure for PONs wherein the ranging information transmitted by the substations (ONUs) to the main station (OLT) comprise a repetitive ranging-bit-pattern and, facultatively, a preamble-bit-pattern. By using ranging information with a sequence length which is eight bits less than the width of the ranging window, the received ranging information falls within the ranging window if it has a coarse ranging accuracy of ±4 bits.

Recently, multi-wavelength PONs (including also NG-PON, namely Next Generation PONs) have been proposed, which employ multiple wavelengths for upstream transmission (upstream channels) and multiple wavelengths for downstream transmission (downstream channels). For instance, the so-called NG-PON2 system defined by the ITU-T Recommendation G.989.1 (March 2013) may use several different downstream wavelengths (e.g. up to eight in the range 1596-1603 nm) and several different upstream wavelengths (e.g. up to eight in the range 1524-1544 nm). A multi-wavelength PON basically may be seen as the superimposition of multiple PONs operating at different upstream wavelengths and different downstream wavelengths over a same ODN. In particular, each PON of the multi-wavelength PON has a respective number of ONUs configured to exchange traffic with the OLT using a certain upstream wavelength and a certain downstream wavelength. All the PONs share the unique ODN using a WDM (Wavelength Division Multiplexing) technique.

Since, within each PON of a multi-wavelength PON, the communication between OLT and ONUs is based on the TDM/TDMA technique as described above, a proper activation procedure is required also for the ONUs of the multi-wavelength PON.

However, the activation procedures for PONs described above can not be straightforwardly applied in a multi-wavelength PON context. The ONUs indeed, especially in the NG-PON case, typically comprise tunable optical transmitters, namely optical transmitters which may be operated to emit on a continuous range or a discrete set of wavelengths. Such optical transmitters are conveniently not wavelength calibrated, meaning that the wavelength at which they start emitting as they are switched on is not predictable in advance with sufficient accuracy. Lack of wavelength calibration is due to the fact that calibration performed in the factory is a quite costly process, whereas the ONUs shall have a reduced cost.

Lack of wavelength calibration however may result in collisions during the activation procedure as described above. For instance, in a NG-PON2 configured with four upstream wavelengths λu1, λu2, λu3, λu4, the activation procedure of a new ONU on e.g. the upstream channel λu2 requires providing a ranging window during which upstream transmission by all the ONUs already configured on the upstream channel λu2 is suspended, while the new ONU sends to the OLT its identifier. In the meanwhile, upstream transmission by the ONUs activated on the other upstream channels λu1, λu3, λu4 continues. Hence, if the ONU under activation (which is still uncalibrated) starts emitting on a wavelength close to any of channels λu1, λu3, λu4 (e.g. λu1) it disadvantageously induces a considerable crosstalk on the upstream traffic on the upstream channel λu1. This may impair the service quality for some customers and may also cause service interruptions.

US 2013/0259482 describes an ONU registration method for TDM/WDM PONs, including transmitting from an OLT a discovery gate to the ONUs. In response to the discovery gate, an unregistered ONU transmits a register request to another OLT. A discovery window is then provided in the OLT that receives the register request, and this OLT receives the register request in the discovery window. However, also this method is not applicable when the optical transmitters of the ONUs are uncalibrated.

In order to avoid collisions, the ranging windows on the various upstream channels of a multi-wavelength PON may be synchronized. In other words, when a new ONU shall be activated on anyone of the upstream channels, ranging windows are opened simultaneously on all the upstream channels of the multi-wavelength PON, meaning that transmission of upstream traffic is suspended for all the ONUs, independently of their transmission wavelength.

EP 0 585 087 describes a ranging method for use in TDMA systems wherein the OLT continuously superimposes either a low-level, low frequency ranging signal or a low-level, high frequency ranging signal on top of the transmitted data signal that is sent from the OLT to the ONUs.

EP 0 840 963 describes a method and device for coarse ranging in a TDMA PON system, wherein a signal with a low bitrate and with a fractional optical power compared to the main informative flow is counterpropagated compared to the main informative flow.

SUMMARY OF THE INVENTION

The inventors have noticed that the synchronization of the ranging windows on the various upstream channels for avoiding collisions during the activation procedure, in a multi-wavelength PON, of a new ONU with a tunable, uncalibrated transmitter has some drawbacks.

In particular, this technique is disadvantageous in that it requires a centralized coordination between the various channel terminations which, at the OLT, are responsible of managing the various channels of the multi-wavelength PON. Such a centralized coordination is however not always feasible, because different channel terminations often pertain to different apparatus or different operators, who typically wish to preserve their autonomy and independence from the other operators sharing the same ODN.

In order to circumvent the need to synchronize the ranging windows on the various upstream channels, in principle out of band techniques could be used, e.g. based on low-level, low frequency signals (briefly, LL-LF signals). In particular, the ONUs might be configured to transmit—at the start of the activation procedure—only activation signals (e.g. the optical signal carrying the ONU identifier) of the LL-LF type, namely with optical power and bitrate much lower than optical power and bitrate of the pre-existing upstream traffic on the ODN transmitted by the already active ONUs. Since the optical power of the LL-LF activation signal is much lower than the optical power of the pre-existing upstream traffic, the LL-LF activation signal substantially does not affect the pre-existing upstream traffic, independently of its wavelength. Hence, no ranging window at all is required, meaning that the LL-LF activation signals may be transmitted continuously without requiring any suspension of the upstream traffic transmission from any ONU of the multi-wavelength PON.

However, the inventors have noticed that the LL-LF activation signal, while being low enough not to impair reception of the pre-existing upstream traffic, has to be suitable for being detected by the receiver at the OLT. These conditions are however not easy to be simultaneously satisfied, as it will be discussed in detail herein after.

As discussed above, when a new ONU with wavelength uncalibrated transmitter is switched on, the LL-LF activation signal transmitted by the new ONU has a not-predictable wavelength. During the activation procedure the new ONU will get however calibrated, namely it is tuned on the desired upstream channel. Assuming for instance that a single ONU is already active on the same upstream channel, the upstream optical signal emitted by this already active ONU is then subject to interferometric crosstalk by the LL-LF activation signal of the new ONU, at least at the end of the activation procedure.

By applying known equations for the calculation of interferometric crosstalk (ITU-T Series G supplement 39—September 2012, sec. 9.6.3, single interferer case), it may be derived that a penalty of 0.2 dB is obtained when the optical power of the LL-LF activation signal is 41 dB below the optical power of the pre-existing upstream signal (under the assumption of upstream bitrate of 2.5 Gbps, average power decision threshold and extinction ratio of 8.2 dB). Hence, assuming that 0.2 dB is the maximum tolerable penalty on each one of the upstream optical signals transmitted by the already active ONUs, the optical power of the LL-LF activation signal at the OLT shall be at least 41 dB below the sensitivity of the OLT receiver (namely, the minimum optical power detectable by the receiver of the OLT) at the upstream data bitrate, namely the bitrate of upstream signals transmitted by already active ONUs. Taking into account that an ODN typically induces differential losses among different branches of up to 15 dB, that the output power of the ONU's transmitters typically is subject to a tolerance of about 5 dB and that the wavelength of the ONU under activation could be located initially far from the OLT optical receiver channel filter center, in the worst case the optical power of the LL-LF activation signal at the OLT receiver could be down to about 100 dB below the optical power of the pre-existing upstream signals. This makes the detection of the LL-LF activation signal by the OLT's receiver practically unfeasible.

Assuming to apply power levelling and wavelength tuning techniques to the ONU's transmitters, the ideal value of 41 dB may be substantially recovered. However, it shall be noticed that the upstream signals transmitted by the ONU(s) already active on the upstream channel act as a noise on the LL-LF activation signal. Hence, in order to make the LL-LF activation signal detectable, a remarkable reduction of the bitrate of the LL-LF activation signal is needed, which allows to filter out as much as possible the noise contribution. The inventors have estimated that a maximum bitrate of 0.85 bps is achievable, under the assumption of an upstream bitrate of 2.5 Gbps, an OLT receiver's sensitivity of −26 dBm, an energy per bit to noise power spectral density ratio $E_b/N_0$ of 8.39 dB—for BPSK modulation—and bit error rate BER of $10^{-4}$. Such a low bitrate, however, disadvantageously makes the activation procedure unacceptably long (it shall be indeed remembered that the LL-LF activation signal carries information which the OLT shall read and process in order to activate the ONU, e.g. the ONU identifier).

In summary, the LL-LF technique as known is hardly practically applicable for the purpose of avoiding collisions during the activation, in a multi-wavelength PON, of new ONUs with tunable, uncalibrated transmitters.

In view of the above, the inventors have tackled the problem of providing a method for activating an ONU in a multi-wavelength PON which solves that aforesaid drawbacks, namely which does not require reciprocal synchronization of the various upstream channels of the multi-wavelength PON and which is practically feasible.

In the present description, the expression "uncalibrated tunable transmitter" will designate an optical transmitter (e.g. a laser) tunable on either a continuous range or a discrete set of wavelengths, which—upon its switching on—starts emitting on a non predictable wavelength amongst those on which it may be tuned.

Further, in the present description and in the claims, the expression "activating an ONU on an upstream channel of a multi-wavelength PON" will designate an operation carried out by the OLT which is propaedeutic to normal operation of the ONU, and which comprises recognizing the ONU and— if the ONU's transmitter is an uncalibrated tunable transmitter—tuning the transmission wavelength of its uncalibrated transmitter on a wavelength lying within a predefined upstream channel of those supported by the multi-wavelength PON. The OLT identifies the upstream channel upon which the ONU shall be activated after it recognizes it.

According to a first aspect, the present invention provides a method for activating an optical network unit on an upstream channel of a multi-wavelength passive optical network, the multi-wavelength passive optical network comprising an optical line termination and a number of further optical network units for transmitting upstream signals to the optical line termination on multiple upstream channels including said upstream channel, the method comprising:
a) during transmission of the upstream signals on the multiple upstream channels, transmitting an activation signal from the optical network unit to the optical line termination, the activation signal having an optical power lower than the optical power of each one of the upstream signals;
b) during at least one time gap having a time gap duration $T_{gap}$, suspending transmission of the upstream signals on the upstream channel; and
c) during the at least one time gap, if the activation signal is transmitted on the upstream channel, detecting the activation signal at the optical line termination.

Preferably, the optical power of the activation signal is at least 28 dB (more preferably, at least 40 dB, even more preferably at least 50 dB) below the sensitivity of the receiver of the optical line termination at the upstream data bitrate. This way, the activation signal induces an acceptable penalty (e.g. of 0.1-1 dB) on each one of the upstream signals transmitted by the further optical network units on the multiple upstream channels.

Preferably, the time gap duration $T_{gap}$ is shorter than $2 \cdot T_{frame}$, wherein $T_{frame}$ is a frame period of the upstream signals transmitted on the upstream channel. More preferably, the time gap duration $T_{gap}$ is shorter than $T_{frame}$. Even more preferably, the time gap duration $T_{gap}$ is shorter than $T_{frame}/10$.

According to some variants, both activation signal and upstream signals on said upstream channel are received at the optical line termination by a receiver having a bandwidth comprised between 75% and 100% the bitrate of said upstream signals transmitted on said multiple upstream channels.

According to such variants, the time gap duration $T_{gap}$ is longer than a minimum value substantially equal to $T_{frame}/32$, wherein $T_{frame}$ is a frame period of said upstream signals transmitted on said upstream channel. Such minimum value provides a detection performance of the activation signal during the time gap equal to the detection performance with which the same activation signal would be detected by the same receiver if transmission of said upstream signals on said upstream channel were not suspended.

According to other advantageous variants, the activation signal is received at the optical line termination by a receiver having a bandwidth comprised between 75% and 100% a bitrate of the activation signal.

According to such advantageous variants, the time gap duration $T_{gap}$ is longer than a minimum value comprised between $T_{frame}/300000$ and $T_{frame}/15000$, wherein $T_{frame}$ is a frame period of the upstream signals transmitted on the upstream channel. Such minimum value provides a detection performance of the activation signal during the time gap equal to the detection performance with which the same activation signal would be detected by the same receiver if transmission of said upstream signals on said upstream channel were not suspended.

Preferably, at step a) the activation signal has a bitrate lower than a bitrate of each one of the upstream signals transmitted by the further optical network units on the multiple upstream channels. More preferably, the bitrate of the activation signal is such that a parameter indicative of the detection performance of the activation signal during the time gap has a minimum predefined value corresponding to a minimum acceptable bit error rate.

Preferably, the bitrate of the activation signal is comprised between 200 bps and 200 kbps (more preferably between 500 bps and 50 kps, even more preferably between 1 kbps and 5 kbps), and the bitrate of each one of the upstream signals transmitted by the further optical network units is preferably higher than 100 Mbps.

Preferably, the phase of the activation signal is synchronized to a downstream frame transmitted from the optical line termination to the optical network unit.

Preferably, step b) comprises suspending the transmission of the upstream signals on said upstream channel during multiple time gaps.

More preferably, the multiple time gaps comprise a single time gap per each upstream frame carrying portions of the upstream signals transmitted on said upstream channel.

Preferably, the inverse of the time lapsing between start of two consecutive time gaps of the multiple gaps is an integer multiple of the bitrate of the activation signal.

Preferably, step c) further comprises sending a feedback signal from the optical line termination to the optical network unit if at step c) the optical line termination detected the activation signal and properly read and processed activation information carried by the activation signal.

Preferably, step a) comprises transmitting the activation signal in a substantially continuous way until a predefined time has expired or until the feedback signal is received at the optical network unit.

Preferably, if no feedback signal is received before the predefined time has expired, the optical network unit changes transmission wavelength and transmits again the activation signal.

Preferably, step b) further comprises suspending transmission of the upstream signals also on upstream channels other than the upstream channel. Transmission on the various upstream channels may be suspended in a synchronous or asynchronous way.

According to a second aspect, the present invention provides a multi-wavelength passive optical network comprising:
- an optical line termination;
- an optical network unit to be activated on an upstream channel of the multi-wavelength passive optical network; and
- a number of further optical network units configured to transmit upstream signals to the optical line termination on multiple upstream channels including said upstream channel, wherein the optical network unit is configured to transmit an activation signal to the optical line termination during transmission of the upstream signals on the multiple upstream channels, the activation signal having an optical power lower than the optical power of each one of the upstream signals; and wherein the optical line termination is configured to, during at least one time gap having a time gap duration $T_{gap}$, suspend transmission of the upstream signals on the upstream channel and, if the activation signal is transmitted on the upstream channel, detect the activation signal during the at least one time gap.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
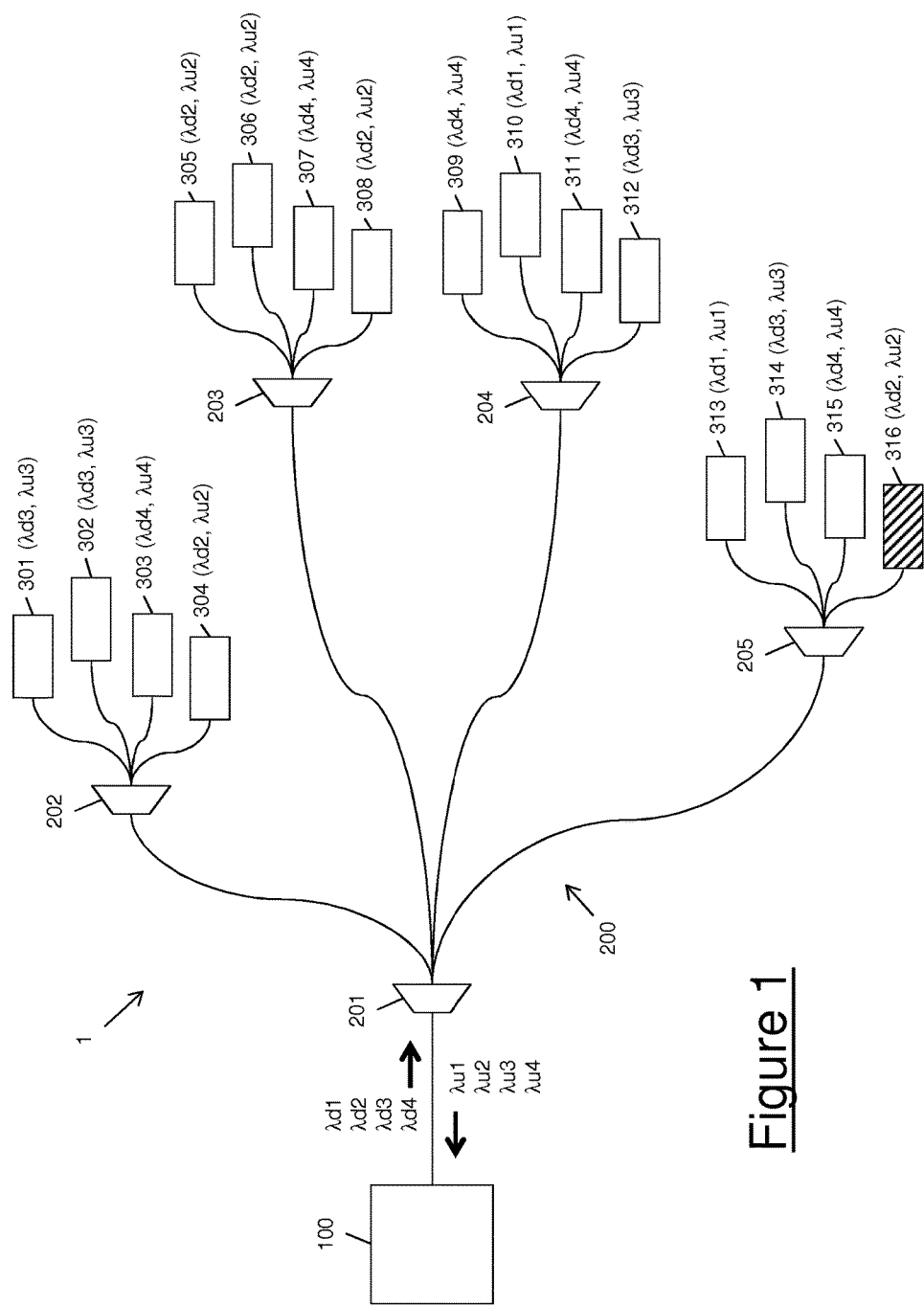
FIG. 1 schematically shows an exemplary multi-wavelength PON network suitable for implementing the method for activating an ONU, according to an embodiment of the present invention.

FIG. 1 schematically shows an exemplary multi-wavelength PON (Passive Optical Network) in which the method for activating an ONU, according to embodiments of the present invention, may be applied.

The multi-wavelength PON 1 comprises an OLT 100, a ODN (Optical Distribution Network) 200 and a plurality of ONUs (Optical Network Units) 301-316. The ODN 200 preferably comprises at least one optical splitter and optical fibres arranged according to a tree topology. The root of the ODN 200 is connected to the OLT 100, while each branch of the ODN 200 is preferably terminated by a respective ONU 301-316. More particularly, the ODN 200 shown in FIG. 1 comprises (by way of non limiting example) five optical splitters 201, 202, 203, 204, 205 with splitting ratio of 1:4, arranged according to a tree topology with sixteen branches.

The multi-wavelength PON 1 preferably employs multiple downstream wavelengths (or downstream channels) for transmission from the OLT 100 to the ONUs 301-316, and multiple upstream wavelengths (or upstream channels) for transmission from the ONUs 301-316 to the OLT 100. By way of non-limiting example, it is assumed that the multi-wavelength PON 1 uses four downstream wavelengths $\lambda d1$, $\lambda d2$, $\lambda d3$, $\lambda d4$ in the range 1596-1603 nm and four upstream wavelengths $\lambda u1$, $\lambda u2$, $\lambda u3$, $\lambda u4$ in the range 1524-1544 nm.

For instance, by way of non limiting example, in the following description it is also assumed that:
- the ONUs 310, 313 are configured to exchange traffic with the OLT using the wavelengths $\lambda d1$, $\lambda u1$;
- the ONUs 304, 305, 306, 308, 316 are configured to exchange traffic with the OLT using the wavelengths $\lambda d2$, $\lambda u2$;
- the ONUs 301, 302, 312, 314 are configured to exchange traffic with the OLT using the wavelengths $\lambda d3$, $\lambda u3$; and
- the ONUs 303, 307, 309, 311, 315 are configured to exchange traffic with the OLT using the wavelengths $\lambda d4$, $\lambda u4$.

Hence, the ONUs 301-316 are basically split into four different groups, each group being configured to exchange user traffic with a respective channel termination of the OLT 100 using a respective upstream wavelength and a respective downstream wavelength. Within each group, the ONUs and the respective channel termination of the OLT 100 exchange user traffic using known TDM/TDMA techniques, while user traffic at different wavelengths (i.e. user traffic addressed to or coming from ONUs of different groups) is multiplexed on the ODN 200 using a known WDM technique. The OLT 100 therefore comprises four different channel terminations (not shown in FIG. 1), which may be either autonomous (meaning that each channel termination autonomously manages the respective upstream channel and downstream channel) or under the control of a central manager of the OLT 100 (meaning that a centralized coordination of the various channel terminations—and hence of the management of the various upstream channels and downstream channels—is provided). According to embodiments not shown in the drawings, the PON 1 may comprise multiple, physically separated OLTs amongst which the various channel terminations are distributed.

Herein after, it is assumed that at least one of the ONUs 301-316 of the multi-wavelength PON 1 still has to be activated on its upstream and downstream channels, namely it is connected to the ODN 200 but has not entered its normal operational state yet (namely, it is not exchanging user traffic with the OLT 100 using the intended upstream wavelength and downstream wavelength yet).

By way of non limiting example, it is assumed that the ONU 316 (indicated by hatching in FIG. 1) still has to be activated on the upstream channel $\lambda u2$ and downstream channel $\lambda d2$. Besides, the ONUs 304, 305, 306, 308 are already active on those channels and are accordingly exchanging user traffic with the OLT 100 using the upstream wavelength $\lambda u2$ and the downstream wavelength $\lambda d2$. In particular, with reference to the upstream direction, the ONUs 304, 305, 306, 308 are sending to the OLT 100 respective upstream signals at the upstream wavelength $\lambda u2$, using a TDMA (Time Division Multiple Access) technique. Accordingly, the upstream traffic received at the OLT 100 from the ONUs 304, 305, 306, 308 is in the form of a sequence of upstream frames having a frame period $T_{frame}$. The frame period $T_{frame}$ is of e.g. 125 µs. Within each upstream frame, the ONUs 304, 305, 306, 308 transmit portions of the respective upstream signals within dedicated timeslots.

It is also assumed that the other ONUs shown in FIG. 1 are already active on the respective channels, and are accordingly exchanging user traffic with the OLT 100 using the respective upstream wavelength and downstream wavelength. Similarly to the upstream channel λu2, also in each one of the upstream channels λu1, λu3, λu4 the upstream traffic generated by the relevant ONUs is in the form of a sequence of upstream frames with frame period $T_{frame}$. The frame period $T_{frame}$ may be the same for all the upstream channels, or it may be different for each upstream channel. According to other variants not shown in the drawings, the upstream traffic on at least one of the upstream channels has not a framed structure.

Figure 2:
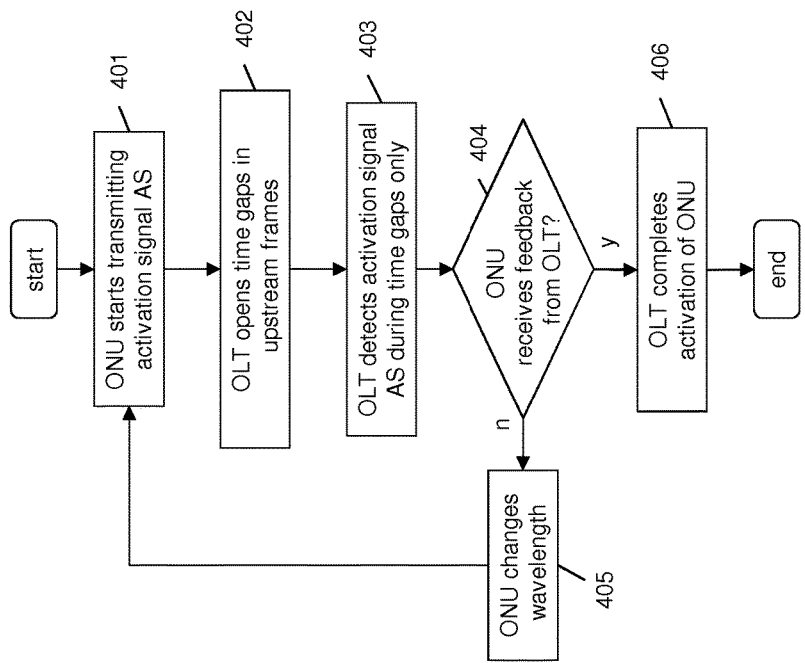
FIG. 2 is a schematic flow chart of the method for activating an ONU, according to an embodiment of the present invention.

With reference now to the flow chart of FIG. 2, the method for activating the ONU 316 according to embodiments of the present invention will be described in detail.

As the ONU 316 to be activated is connected to the ODN 200, it preferably starts transmitting an activation signal AS to the OLT 100 via the ODN 200 (step 401). Step 401 is optionally preceded by a step during which the ONU 316 under activation recovers the receiving clock from the OLT 100 and synchronizes to the downstream frames (step not shown in FIG. 2).

The activation signal AS is preferably a low level, low frequency signal, namely it has optical power $P_C$ and bitrate $R_C$ lower than optical power $P_D$ and bitrate $R_D$ of each one of the upstream signals that the already active ONUs 301-315 are transmitting to the OLT 100.

In particular, the optical power $P_C$ of the activation signal AS is selected so as to induce an acceptable maximum penalty (e.g. of 0.2 dB) on each one of the upstream signals that the already active ONUs 301-315 are transmitting to the OLT 100. More specifically, the optical power $P_C$ of the activation signal AS at the receiver of the OLT 100 is preferably lower than the sensitivity of the receiver of the OLT 100 (namely, the minimum power detectable by the receiver of the OLT 100) at the data upstream bitrate (namely, the bitrate of the upstream signals transmitted by the already active ONUs 301-315). Even more specifically, the optical power $P_C$ of the activation signal AS at the receiver of the OLT 100 is preferably 28 dB, more preferably 40 dB, even more preferably 50 dB below the sensitivity of the receiver of the OLT 100 at the data upstream bitrate. For instance, the optical power $P_C$ of the activation signal AS at the receiver of the OLT 100 may be 41 dB below the sensitivity of the receiver at the OLT 100. Taking into account, as explained above, the differential losses induced by the ODN 200, the tolerance of the output power of the ONU's transmitters and the fact that the wavelength of the ONU 316 under activation could be located initially far from the OLT optical receiver channel filter center, the optical power with which the activation signal AS is transmitted by the ONU 316 is preferably substantially 61 dB below the transmission power of the already active ONUs 301-315, which typically ranges from 5 dBm to 9 dBm, depending on the bitrate $R_D$ and the system class. For instance, if each one of the ONUs 301-315 has a transmission power of 9 dBm, the optical power of the activation signal AS at the ONU 316 is 9 dBm−61 dB=−52 dBm. This value, as discussed above, provides an acceptable crosstalk penalty of 0.2 dB on each one of the upstream signals, if the bitrate $R_D$ is 2.5 Gbps. In order to provide such a low transmission power (which is well underneath the typical transmission power of the optical transmitter of the ONU 316), an attenuator or a shutter is preferably provided at the output of the optical transmitter. This allows preserving the spectral properties of the optical transmitter, so that the activation signal AS has neither an altered spectrum nor an altered wavelength, hence the subsequent tuning step can properly tune the wavelength of the transmitter of the ONU 316.

Besides, the bitrate $R_C$ of the activation signal AS is selected so as to enable its detection by the OLT 100. Further quantitative considerations in this connection will be provided herein after.

Assuming that the ONU 316 to be activated comprises a tunable, uncalibrated optical transmitter (namely an optical transmitter which may be operated to emit on a continuous range or a discrete set of wavelengths, the actual wavelength at which it starts emitting as it is switched on being however unpredictable), the wavelength of the activation signal AS may be any one of the wavelengths at which the optical transmitter of the ONU 316 may be tuned. Hence, though the ONU 316 shall be activated on the nominal upstream channel λu2, at step 401 the wavelength of the activation signal AS is not necessarily λu2. The tuning of the ONU 316 at the desired upstream wavelength λu2 will be operated subsequently by the OLT 100, as it will be described in detail herein after.

Besides, the phase of the activation signal AS is preferably synchronized to the downstream frames transmitted by the OLT 100 on the downstream channel λd2 on which the ONU 316 shall be activated. This advantageously eases the reception of the activation signal AS at the OLT 100, as it will be discussed in detail herein after.

Besides, the activation signal AS preferably carries activation information which the ONU 316 to be activated shall communicate to the OLT 100. Preferably, the activation signal AS carries a unique identifier of the ONU 316, allowing the OLT 100 to uniquely identify the ONU 316 and to retrieve its activation parameters (e.g. its wavelength tuning parameters). Additionally, the activation signal AS may comprise other activation information, such as for instance status information or control information.

Preferably, the activation signal AS is transmitted by the ONU 316 to the OLT 100 in a substantially continuous way, meaning that it is transmitted substantially with no interruptions. The conditions upon which the ONU 316 stops transmitting the activation signal AS will be described herein after.

While the ONU 316 to be activated is transmitting the activation signal AS in a substantially continuous way, transmission of upstream signals on the upstream channel λu2 (namely, the same upstream channel on which the ONU 316 shall be activated) is temporarily suspended for a time gap (step 402). The time gap duration $T_{gap}$ is preferably shorter than twice a frame period $2 \cdot T_{frame}$. More preferably, the time gap duration $T_{gap}$ is shorter than a frame period $T_{frame}$. Even more preferably the time gap duration $T_{gap}$ is shorter than a frame period $T_{frame}/10$.

Figure 3:
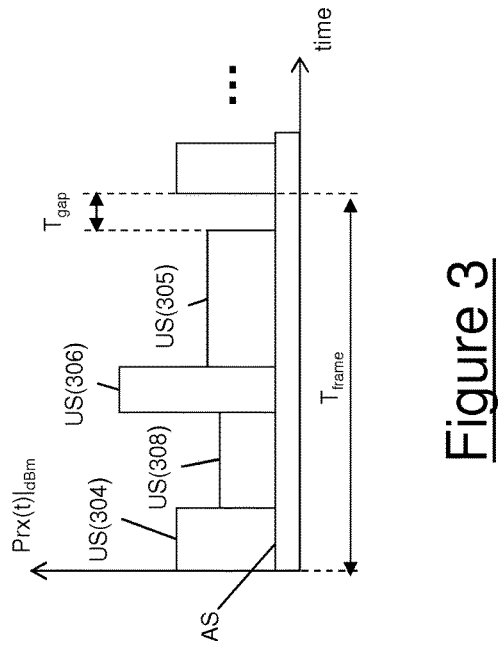
FIG. 3 is a time diagram schematically depicting a step of the method according to an embodiment of the present invention.

Step 402 is schematically depicted in the time diagram of FIG. 3. FIG. 3 schematically shows an exemplary upstream frame of the upstream channel λu2. The upstream frame is divided into timeslots, and each timeslot is dedicated to the transmission of a portion of an upstream signal US(304), US(305), US(306) and US(308) generated by one of the ONUs 304, 305, 306, 308 already active on the upstream channel λu2. As shown in FIG. 3 by way of non limiting example, the transmission of the upstream signals is suspended within the frame for a time gap $T_{gap}$ shorter than the frame period $T_{frame}$. Hence, in this case the suspension only affects a portion of the upstream traffic carried by the upstream frame. If the upstream traffic has not a framed structure (namely, if no $T_{frame}$ is defined), the time gap duration $T_{gap}$ is such that the overall capacity available for the upstream traffic on the upstream channel λu2 is reduced by a certain amount, as it will be discussed in detail herein after.

According to advantageous variants, several time gaps are opened at regular time intervals within the sequence of time frames carrying the upstream signals of the ONUs 304, 305, 306, 308 already active on the upstream channel λu2. For instance, if $T_{gap}<T_{frame}$, one time gap per upstream frame may be opened over a certain number of consecutive upstream frames, or a time gap may be opened every N consecutive upstream frames. Preferably, the time gap is located always at a same position of the frame. For instance, each time gap may be located either at the end of the respective upstream frame (as shown in FIG. 3), or at the beginning of the respective upstream frame. This is however not limiting, since the time gaps may be located at any position of the upstream frames, namely at any intermediate position of the upstream frames. Besides, in case the bitrate $R_C$ of the activation signal AS is lower than the frame rate VT frame, the time gap rate (namely, the inverse of the time lapsing between start of two consecutive time gaps) is preferably an integer multiple of the bitrate $R_C$. According to other embodiments, the time gaps may be opened at different positions within the respective upstream frames (e.g. the initial position in a first upstream frame, a first intermediate position in the subsequent upstream frame, an a second intermediate position in the still subsequent upstream frame, and so on). This may be advantageous in order to reduce jitter on data.

In order to suspend transmission from the ONUs 304, 305, 306, 308 already active on the upstream channel λu2 during the time gaps, the OLT 100 (in particular, the channel termination responsible of managing the upstream channel λu2) preferably omits sending to the ONUs 304, 305, 306, 308 the grants for upstream transmission.

Then, according to embodiments of the present invention, the OLT 100 (and in particular the channel termination responsible of managing the upstream channel λu2) detects the activation signal AS during the time gaps only (step 403). As mentioned above, the wavelength of the activation signal AS may be anyone of the wavelengths at which the uncalibrated transmitter of the ONU 316 may be tuned. Hence, the wavelength of the activation signal AS may lie in any one of the upstream channels λu1, λu2, λu3, λu4. The wavelength of the activation signal AS may accordingly lie out of or within the receiver bandwidth of the channel termination responsible of managing the upstream channel λu2.

In the first case, at step 403 the OLT 100 (in particular its channel termination responsible of managing the upstream channel λu2) can not detect the activation signal AS during its time gaps. This case will be dealt with herein after.

In the second case, at step 403 the OLT (in particular its channel termination responsible of managing the upstream channel λu2) may detect the activation signal AS during its time gaps. In particular, if the time gap rate is an integer multiple of the bitrate $R_C$ of the activation signal AS and if the phase of the activation signal AS is synchronized to the downstream frames received from the OLT 100, the reception of the activation signal AS at the OLT 100 is advantageously eased. First of all, the OLT 100 may easily derive from the downstream frame clock the clock for detecting the activation signal AS. Moreover, the OLT 100 may optionally perform a coarse measurement of the distance of the ONU 316 based on the phase of the received activation signal AS, the phase being dependent on the distance. Besides, the OLT 100 may collect an integer number of samples per bit of the activation signal AS, each sample corresponding to a single time gap period (when the inverse of the bitrate $R_C$ of the activation signal AS is larger than a time gap period $T_{gap}$). These samples may accordingly be optimally integrated and contribute to optimize the detection performance of the OLT 100. In case the time gap rate is not an integer multiple of the bitrate $R_C$ and/or the phase of the activation signal AS is not synchronized to the downstream frame period, the OLT 100 may nonetheless detect the activation signal AS. However, recovering the clock needed to correctly sample the activation signal AS is more difficult. Moreover, sampling jitter may arise.

In any case, since during the time gaps transmission of upstream signals from the ONUs 304, 305, 306, 308 already active of the upstream channel λu2 is suspended, the detection of the activation signal AS is remarkably improved, as it will be discussed in detail herein after.

Then, if at step 403 the OLT 100 (namely its channel termination responsible of managing the upstream channel λu2) was able to detect the activation signal AS during its time gaps and to properly read and process the activation information carried by the activation signal AS, it preferably sends a feedback signal to the ONU 316 to be activated (step not shown in the drawings).

The ONU 316 to be activated, on the other hand, is preferably configured to transmit the activation signal AS for a predefined period of time. If, upon expiration of such period of time, the ONU 316 does not receive any feedback signal from the channel termination which is responsible of managing the upstream channel λu2 at the OLT 100 (step 404), it determines that it is trying to activate on the wrong upstream channel (namely, the wavelength of the activation signal AS was lying in one of the upstream channels λu1, λu3, λu4, in-between two upstream channels or even outside the upstream wavelength range). Hence, the ONU 316 preferably changes its transmission wavelength (step 405) and tries to activate on a new wavelength. Steps 401, 402, 403, 404 and 405 are accordingly iterated, until the ONU 316 receives a feedback signal from the channel termination responsible of managing the upstream channel λu2 at the OLT 100, meaning that the ONU 316 transmission wavelength now lies within the receiver bandwidth of the channel termination responsible of managing the upstream channel λu2 at the OLT 100.

When the ONU 316 receives the feedback signal from the OLT 100, the ONU 316 is under the control of the OLT 100 (in particular, of the channel termination responsible of managing the upstream channel λu2), which preferably completes the activation of the ONU 316 (step 406). In particular, the OLT 100 preferably optimizes the wavelength tuning of the ONU 316 by sending it suitable wavelength tuning commands. At step 406, the OLT 100 may also calculate the distance of the ONU 316, e.g. by using the phase of the activation signal AS as mentioned above. Alternatively, the OLT 100 may carry out a known ranging procedure, by opening a ranging window on the upstream channel λu2 on which the ONU 316 is being activated. It shall be noticed that, since the transmitter of the ONU 316 is now calibrated on the upstream wavelength λu2, there is no longer a risk of collisions with upstream signals generated by the ONUs already active on the other upstream channels λu1, λu3 and λu4, even if the ranging windows on the various upstream channels are not synchronized and even if no ranging window is opened at all on the other channels.

Therefore, the method for activating an ONU according to embodiments of the present invention exhibits several advantages.

The method described above indeed solves the problem of collisions which might arise during the activation of an ONU with a non-calibrated tunable transmitter by using a low level, low frequency activation signal combined with time gaps for the detection of the activation signal.

Though the activation signal is a low level signal (and then it may be hardly detectable), use of time gaps greatly improves its detection conditions at the OLT (as it will be discussed in detail herein after), thereby allowing to increase the bitrate of the activation signal to such an extent that makes this technique practically feasible, especially if an optimized receiver is adopted.

On the other hand, no synchronization of the time gaps between the various upstream channels is required, because the activation signal is a low level signal, and accordingly it may be substantially continuously superimposed to pre-existing upstream signals substantially without impairing their reception.

Figure 4:
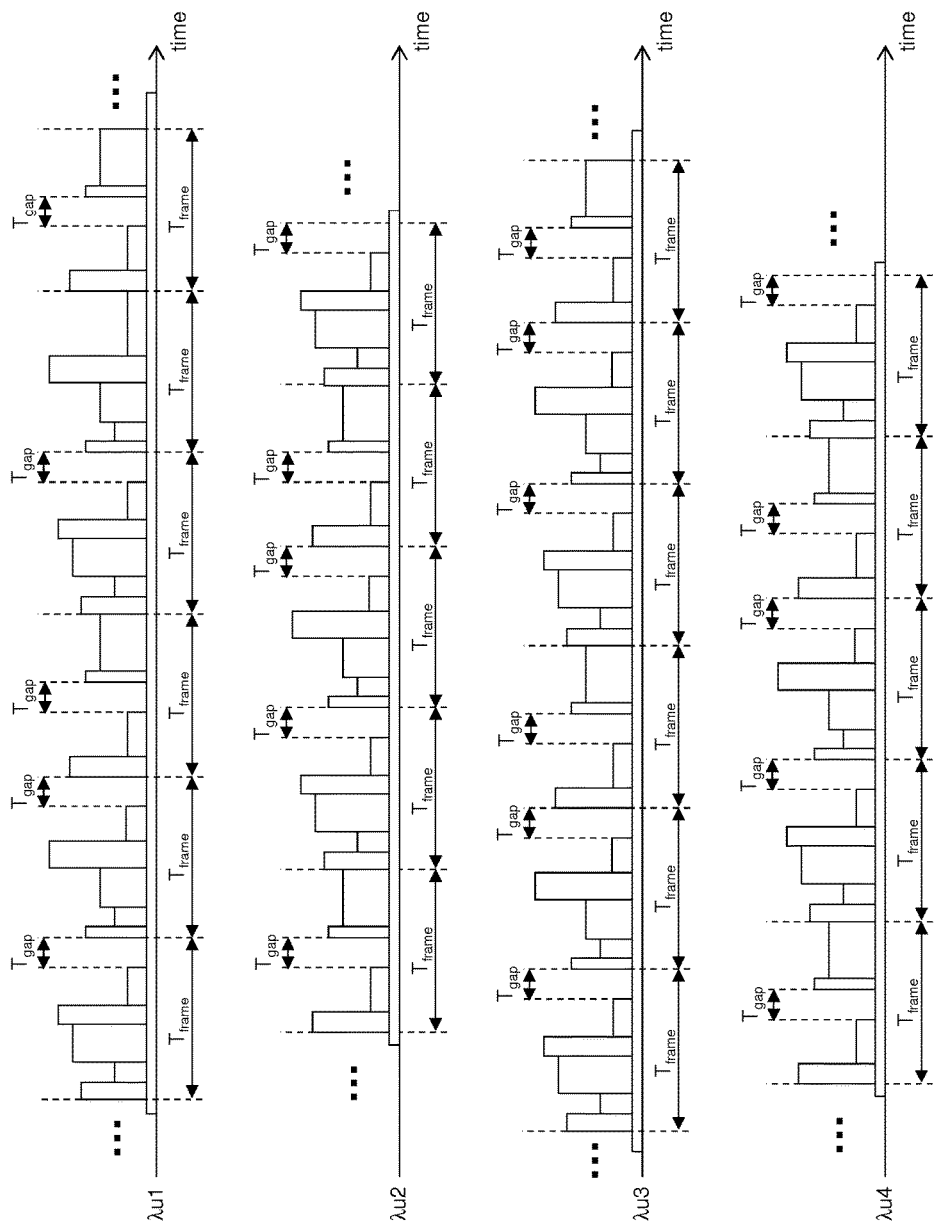
FIG. 4 shows time diagrams schematically depicting the method of the invention applied to the multi-wavelength PON of FIG. 1.

This means that the OLT 100 may advantageously open time gaps on each upstream channel $\lambda u1$, $\lambda u2$, $\lambda u3$, $\lambda u4$ independently, as schematically depicted in FIG. 4. In particular, FIG. 4 shows exemplary time gaps opened on the upstream channels $\lambda u1$, $\lambda u2$, $\lambda u3$, $\lambda u4$ by the OLT 100, in particular by the channel terminations responsible of managing the upstream channels $\lambda u1$, $\lambda u2$, $\lambda u3$, $\lambda u4$ at the OLT 100. FIG. 4 shows that the four channel terminations of the OLT 100 open time gaps within the respective upstream channels in an asynchronous way, since each channel termination autonomously decides when time gaps shall be opened on its upstream channel independently of the other channel terminations, and tries to autonomously detect possible activation signal(s) during the time gaps opened on its respective upstream channel. Since no reciprocal synchronization of the time gaps is required between the upstream channels $\lambda u1$, $\lambda u2$, $\lambda u3$, $\lambda u4$, more generally no reciprocal synchronization of the upstream frames in the various upstream channels is required. This is also apparent in FIG. 4, where the start times of the upstream frames in the various upstream channel are clearly not aligned. Hence, autonomy of each channel termination in managing the respective channels is advantageously fully preserved.

Furthermore, each channel termination may also advantageously determine the time gap duration of the respective time gaps in an autonomous way. For instance, while a channel termination may decide to open a single long time gap (namely, with $T_{gap} > T_{frame}$) for activating new ONUs, another channel termination of the same OLT may decide to open multiple short time gaps (namely, with $T_{gap} < T_{frame}$) for activating new ONUs. In FIG. 4, by way of example, all the channel terminations of the OLT 100 open multiple time gaps with $T_{gap} < T_{frame}$, all the time gaps having substantially a same duration. As discussed above, this is however non limiting.

Hence—if the various channels pertain to different apparatuses/operators sharing the same ODN 200—the various operators may advantageously preserve their autonomy and a certain flexibility in choosing time gap duration, and number and positions of the time gaps. Each operator may accordingly autonomously decide when time gap(s) shall be opened on its own upstream channel for activation purposes. For instance, an operator may decide to systematically open time gaps on its own upstream channel in a periodic way, in order to periodically check whether a new ONU shall be activated. Another operator of the same multi-wavelength PON, besides, may decide to open time gaps only when a new ONU is expected to activate on its upstream channel.

Furthermore, though opening time gaps on the upstream channels other than $\lambda u2$ (namely, the one on which the ONU 316 shall be activated) is not needed for allowing detection of the activation signal AS, nonetheless according to some variants of the present invention the channel terminations of the OLT 100 may open time gaps (either in a synchronous or asynchronous way) on all the upstream channels $\lambda u1$, $\lambda u2$, $\lambda u3$, $\lambda u4$ during transmission of the activation signal AS. This allows shortening the activation time of the new ONU 316. Indeed, since the wavelength of the activation signal AS may fall within the receiver bandwidth of anyone of the channel terminations of the OLT 100 (which is however not known a priori), opening time gaps on all the upstream channels allows such channel termination detecting the activation signal AS as the ONU 316 starts transmitting it. In other words, whichever is the transmission wavelength of ONU 316 as it is switched on, one of the channel terminations of the OLT 100 is capable of detecting the activation signal AS at that wavelength. Hence, the OLT 100 may detect the activation signal AS as the ONU 316 starts transmitting it, independently of its wavelength, via one of its channel terminations. In other words, with reference again to the flow chart of FIG. 2, the OLT 100 is able to detect the activation signal AS at the first iteration of step 403, without the need of performing any iteration of step 405 (the ONU 316 changes wavelength). Only in case the activation signal AS lies in-between two upstream channels, or outside the OLT receivers wavelength band, iterations of step 405 will be necessary.

It shall be noticed that, differently from the known ranging procedure, synchronization of the time gaps on the various upstream channels according to such variants of the invention is not needed. The implementation of such variants of the invention requires anyway a central coordination between the channel terminations of the OLT 100, which is not always possible or desirable.

As mentioned above, detection of the activation signal AS during the time gaps advantageously improves the detection condition of the activation signal AS at the OLT compared to the known LL-LF technique where detection is done in the presence of upstream data traffic.

More particularly, as discussed above with reference to the known implementation of the LL-LF technique (no time gaps), a penalty associated with interferometric crosstalk of 0.2 dB is obtained on the reception of an upstream signal from an already active ONU, when the optical power of the activation signal is 41 dB below the sensitivity of the receiver at the OLT at the upstream data bitrate. Besides, in order to enable the OLT to detect the activation signal, the noise induced by the upstream signal on the activation signal shall be minimized. Since the power of such noise is much greater than the power of the activation signal itself, very low bitrates (<1 bps in a typical scenario) shall be used in order to effectively filter out the noise contribution, which make the activation procedure as known unacceptably long.

Conversely, the inventors have estimated that detecting the activation signal AS during the time gaps remarkably relieves the noise impact on the activation signal AS during its detection, thereby allowing to increase the bitrate of the activation signal AS to acceptable values.

More particularly, the performance of detection of the activation signal AS at the OLT 100 during the time gaps is determined by:

- the optical power $P_C$ of the activation signal AS (that, as discussed above, is limited by the maximum crosstalk penalty acceptable on the upstream signals transmitted by the already active ONUs);
- the time gap duration $T_{gap}$ (generally speaking, the higher the time gap duration $T_{gap}$, the higher the energy per bit of the activation signal AS that can be collected in the time gaps); and
- the amount of noise NO at the receiver of the OLT 100 (which basically is the intrinsic receiver noise contribution, since all the other ONUs 301-315 of the multi-wavelength PON 1 are either silent during the time gaps or operating on a different upstream channel).

Depending on the ratio between the bitrate $R_C$ of the activation signal AS and the time gap duration $T_{gap}$, a single time gap may allow detection of several bits carried by the activation signal AS (which happens if the bitrate of the activation signal AS is relatively high, e.g. if $R_C >> 1/T_{frame}$ and $T_{gap} < T_{frame}$), or detection of a single bit is spread over a number of consecutive time gaps (which happens if the bitrate of the activation signal AS is relatively low, e.g. $R_C << 1/T_{frame}$ and $T_{gap} < T_{frame}$). In both cases, the energy per bit $E_{b,C}$ of the activation signal AS within time gaps is given by the following equation:

$$E_{b,C} = \frac{1}{M_g} \cdot \frac{m^2 \cdot \overline{P}_C^2}{2R_C}, \quad [1]$$

where $M_g = T_{frame}/T_{gap}$, m is the modulation index (assuming for example that the activation signal AS is a modulated subcarrier, e.g. BPSK), $P_C$ is the average optical power of the control signal AS and $R_C$ is the bitrate of the control signal AS.

In order to estimate the noise power spectral density NO at the receiver of the OLT 100, it is firstly assumed that the OLT 100 (in particular, the channel termination responsible of managing the upstream channel λu2) comprises a single receiver for detecting both the activation signal AS and the upstream signals generated by the ONUs already active on the channel λu2. The receiver of the channel termination responsible of managing the upstream channel λu2 at the OLT 100 has the structure schematically depicted in FIG. 5. The receiver 500 comprises a photodiode 501 and a trans-impedance amplifier 502 connected at the output of the photodiode 501. The receiver 500 also comprises a clock and data recovery unit 503 connected to the output of the trans-impedance amplifier 502, which is configured to recover clock and user data from the upstream signals transmitted from the ONUs 304, 305, 306, 308 already active on the upstream channel λu2. The receiver 500 also preferably comprises a band-pass filter 504, also connected at the output of the same trans-impedance amplifier 502. The band-pass filter 504 is preferably centered substantially around the subcarrier of the activation signal AS, so as to filter out the intrinsic noise of the trans-impedance amplifier. It has to be noted indeed that this trans-impedance amplifier 502, being used for reception of both the activation signal AS and the upstream signals generated by the ONUs already active on the channel λu2, has a large bandwidth, and therefore also a relatively high noise. In particular, the bandwidth is typically about 75% of the bitrate $R_D$ of the upstream signals carrying user data. For instance, if the bitrate $R_D$ is 2.5 Gbps, the receiver bandwidth is about 1.9 GHz. The receiver 500 also preferably comprises a digital signal processing unit 505 connected at the output of the band-pass filter 504. The digital signal processing unit 505 is configured to recover the activation information carried by the activation signal AS.

Figure 5:
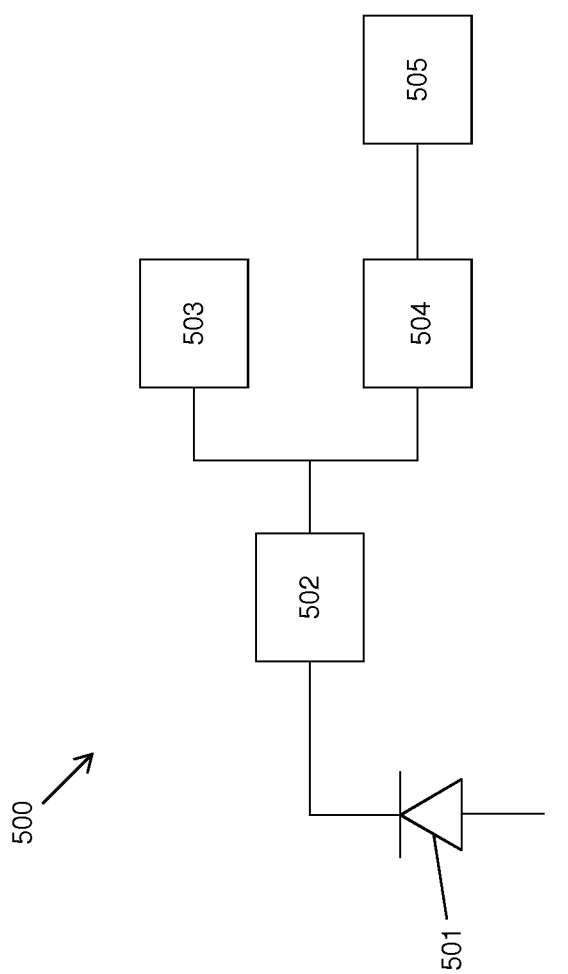
FIG. 5 schematically shows a receiver of the OLT suitable for receiving an activation signal according to embodiments of the present invention.

Therefore, in the receiver 500 of FIG. 5, the photodiode 501 and the trans-impedance amplifier 502 normally used for detection of the upstream signals transmitted from the ONUs 304, 305, 306, 308 already active on the upstream channel λu2 are also used for detection of the activation signal AS transmitted by the ONU 316 to be activated on the upstream channel λu2. This means that, in the following estimation of the noise power spectral density N0, it is assumed that at least part of the receiver 500 is not specifically optimized for the reception of the activation signal AS. The results provided by such estimation are accordingly pejorative, and may be improved by assuming to use a dedicated receiver for the activation signal AS, as it will be discussed in detail herein after.

In the receiver 500 of FIG. 5, the noise power spectral density N0 may then be estimated as the optical power that makes the minimum-power upstream signal be received at a typical pre-FEC BER=$10^{-4}$, namely (when the photodiode 501 is a PIN photodiode):

$$N0 \cong \frac{\overline{P}_D^2}{16 \cdot R_D}, \quad [2]$$

where $P_D$ is the average power of the minimum-power upstream signal corresponding to the reference BER=$10^{-4}$ (i.e. the receiver sensitivity), while $R_D$ is the bitrate of the upstream signal. Equation [2] has been obtained under the assumption that the noise power spectral density NO is flat over the whole receiver spectrum and assuming an upstream signal with infinite extinction ratio.

Hence, combining equation [1] and equation [2], the performance of the detection of the activation signal AS during a time gap, expressed in terms of energy per bit to noise power spectral density ratio, is provided by the following equation (when a PIN photodiode is used):

$$\left(\frac{E_b}{N0}\right)_C^{timegap} = \left(\frac{\overline{P}_C}{\overline{P}_D}\right)^2 \frac{R_D}{R_C} \cdot \frac{8m^2}{M_g} \quad [3]$$

From equation [3], it is apparent that the detection performance improves as the average power of the control signal $P_C$ increases, the bitrate $R_C$ of the control signal decreases, and the ratio $M_g$ decreases (namely, as the time gap duration $T_{gap}$ increases).

The inventors have then compared the performance of detection of the activation signal AS during the time gaps with the performance of detection if no time gap were provided (namely, if during detection of the activation signal AS the transmission from the ONUs already active on the same upstream channel λu2 were not suspended). The energy per bit to noise power spectral density ratio for such case is provided by the following equation:

$$\left(\frac{E_b}{N0}\right)_C^{no\text{-}timegap} = \left(\frac{\overline{P}_C}{\overline{P}_D}\right)^2 \frac{R_D}{R_C} \cdot \frac{m^2}{M_g} \quad [4]$$

By comparing equation [3] with equation [4], it follows:

$$\left(\frac{E_b}{N0}\right)_C^{timegap} = \left(\frac{E_b}{N0}\right)_C^{no\text{-}timegap} \cdot \frac{32}{M_g} \quad [5]$$

Hence, under the above conservative assumptions on the receiver structure (non optimized receiver), it may be noticed that provision of dedicated time gaps for the detection of the activation signal AS entails an improvement of the detection performance—over the case with no time gap—when the ratio $M_g$ is lower than 32. Hence, all other conditions (namely, bit rates $R_C$, $R_D$, powers $P_C$, $P_D$ and modulation format) being equal, an improvement is obtained when the time gap duration $T_{gap}$ is at least $T_{frame}/32 \cong 3\%$ $T_{frame}$. This means that if $T_{frame}=125$ µs, a time gap duration $T_{gap}$ of at least 3.9 µs provides detection performance equal to or better than the known case with no time gap, all the other conditions (namely, bit rates $R_C$, $R_D$, powers $P_C$, $P_D$ and modulation format) being equal.

An example is provided herein after. Assuming $R_D=2.5$ Gbps, a receiver sensitivity of −26 dBm to −32.5 dBm and an ONU transmission power of 5 dBm to 9 dBm, in order to guarantee a penalty of 0.2 dB to 1 dB on the upstream signals, the optical power $P_C$ of the activation signal AS, at the OLT receiver, shall be comprised between −73.5 dBm and −54 dBm. Assuming $T_{frame}=125$ µs, m=0.9 (which is a typical value for BPSK modulation) and $T_{gap}=3.9$ µs (which, as discussed above, is the time gap duration providing detection performance equal to the known case with no time gap), an energy per bit to noise power spectral density ratio equal to 8.39 dB (which is the value required for providing a pre-FEC BER of $10^{-4}$ in case of BPSK modulation) is achieved when the bitrate $R_C$ of the activation signal AS is about 0.5 bps or 184 bps respectively for a penalty of 0.2 dB or 1 dB. This, as discussed above, are however too low bitrates for the activation signal AS, since they leads to unacceptably long activation times.

Besides, by providing a time gap duration $T_{gap}$ K times the minimum value $T_{frame}/32$ (e.g. K=10 times), also the bitrate $R_C$ of the activation signal AS may be multiplied by K, while preserving the same detection performance (namely, the same value 8.39 dB of the energy per bit to noise power spectral density ratio). Hence, advantageously, detection of the activation signal AS during time gaps allows increasing the bitrate $R_C$ of the activation signal AS, thereby shortening the activation time in comparison to the known case with no time gaps. The time gap duration $T_{gap}$ however may not be increased indefinitely, its preferred maximum value being $2T_{frame}$, as discussed above. The maximum achievable bitrate $R_C$ is accordingly limited too. It shall also be noticed that, according to equation [4], the bitrate $R_C$ of the activation signal AS increases as the bitrate $R_D$ increases. In general, the bitrate $R_C$ of the activation signal AS is preferably comprised between $R_D \cdot 10^{-7}$ and $R_D \cdot 10^{-5}$, e. g. $R_D \cdot 10^{-6}$.

The inventors have however noticed that, since the activation signal AS is detected during the time gaps, a further improvement of the detection performance (and therefore the possibility to further increase the bitrate $R_C$ of the activation signal AS) may be achieved by detecting the activation signal AS with an optimized receiver, namely a receiver dedicated exclusively to reception of the activation signal AS (the upstream signals carrying user traffic being instead received by a separate, dedicated receiver).

It is indeed noticed that, while the detection performance in the known case (no time gap) is mainly limited by the average power of the upstream signals transmitted by the already active ONUs within the bandwidth of the activation signal AS (which can not be further reduced by optimizing the receiver), the detection performance in the time gap case is mainly limited by the intrinsic noise of the receiver, because there is no power of the upstream signals transmitted by the already active ONUs during the time gaps. Hence, by suitably optimizing the receiver, an improvement of the detection performance in the time gap case may be obtained.

Figure 6:
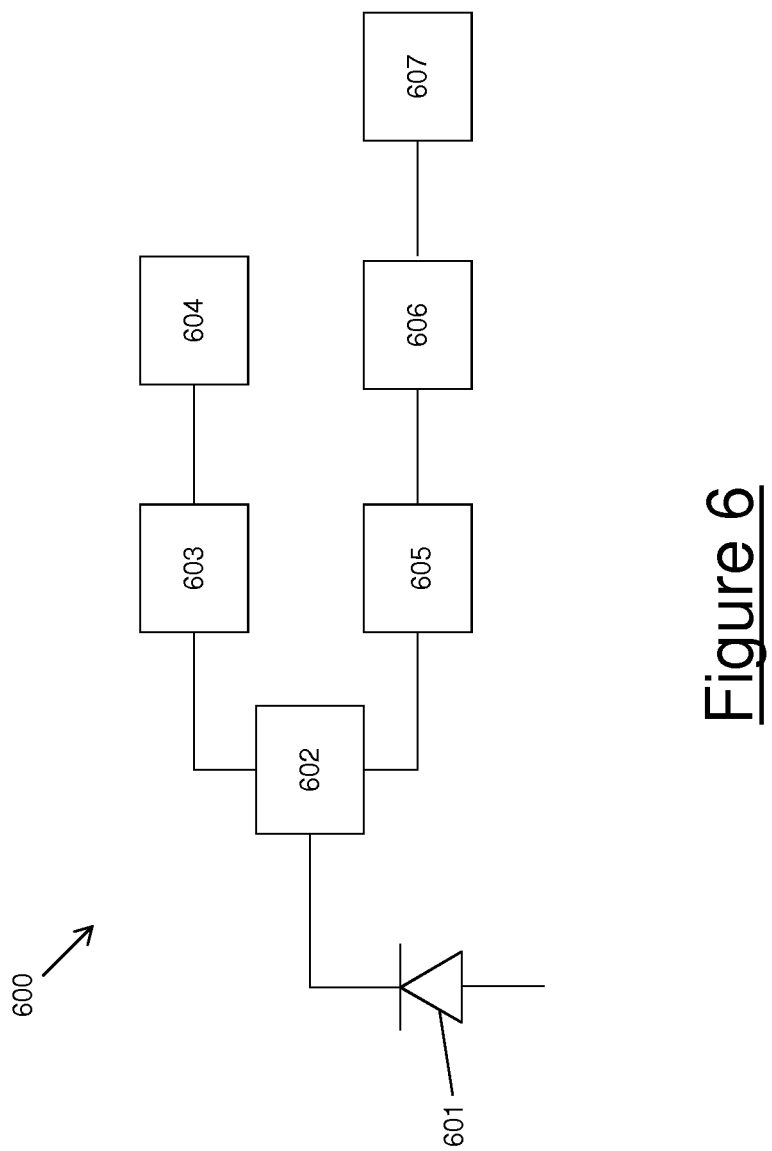
FIG. 6 schematically shows a receiver of the OLT suitable for receiving an activation signal according to other embodiments of the present invention.

As schematically depicted in FIG. 6, the optimized receiver 600 preferably comprises a photodiode 601 and a filter 602 suitable for separating activation signal AS and upstream signals. The receiver 600 also comprises a first trans-impedance amplifier 603 suitable for amplifying the upstream signals transmitted from the ONUs 304, 305, 306, 308 already active on the upstream channel λu2, and a clock and data recovery unit 604 connected to the output of the trans-impedance amplifier 603, which is configured to recover clock and user data from the upstream signals transmitted from the ONUs 304, 305, 306, 308 already active on the upstream channel λu2. Besides, the receiver 600 also comprises a second trans-impedance amplifier 605 with a filter 606 and a digital signal processing unit 607 configured to recover the activation information carried by the activation signal AS. The bandwidth of the trans-impedance amplifier 605-filter 606 is much narrower than the bandwidth of the first trans-impendence amplifier 603. In particular, the bandwidth of the trans-impendence amplifier 605-filter 606 comprised in the optimized receiver 600 is preferably comprised between 75% and 100% the bitrate $R_C$ of the activation signal AS. For instance, if the bitrate $R_C$ of the activation signal AS is 1 kbps (which is a bitrate achievable using an optimized receiver, as it will be discussed in detail herein after), the bandwidth of the trans-impendence amplifier 605-filter 606 may be about 1 kHz.

The receiver 600 shown in FIG. 6—though it has two separate branches dedicated to reception of the activation signal AS and of the upstream signals from the ONUs already active on the upstream channel λu2, respectively—advantageously comprises a single photodiode. According to other embodiments not shown in the drawings, the receiver may comprise two separate photodiodes for the detection of the activation signal AS and of the upstream signals from the ONUs already active on the upstream channel λu2, respectively.

The optimized receiver 600, whose branch dedicated to reception of the activation signal AS has a bandwidth narrower than the receiver 500, also has a noise power spectral density lower than that estimated with equation [2]. For instance, typical noise power spectral density values for non optimized receivers are $1.6 \cdot 10^{-22}$ A$^2$/Hz for a bandwidth of 10 Gbps, $4 \cdot 10^{-24}$ A$^2$/Hz for a bandwidth of 2.5 Gbps, and $3.2 \cdot 10^{-24}$ A$^2$/Hz for a bandwidth of 622 Mbps. On the other hand, an optimized receiver, whose bandwidth is tailored on the bitrate $R_C$ of the activation signal as described above, typically exhibits noise power spectral densities of $10^{-25}$ A$^2$/Hz-$10^{-26}$ A$^2$/Hz. Hence, in comparison to values provided by equation [2], by using an optimized receiver the noise power spectral density is reduced by at least 2 or 3 orders of magnitude.

This corresponds to an improvement of the detection performance (namely, to an increase of the energy per bit to noise power spectral density ratio) by 20 or 30 dB, in comparison to the case of detection during time gaps using a non optimized receiver, all the other conditions (namely, time gap duration $T_{gap}$, bit rates $R_C$, $R_D$, powers $P_C$, $P_D$ and modulation format) being equal.

This improvement of the detection conditions provided by the optimized receiver may be exploited e.g. for reducing the time gap duration $T_{gap}$ (which is desirable if one wishes to reduce the upstream bandwidth consumption for activation purposes) and/or for increasing the bitrate $R_C$ of the activation signal AS (which is instead desirable if one wishes to reduce the activation time).

Assuming that only the reduction of the upstream bandwidth consumption is pursued, the minimum time gap duration $T_{gap}$ which provides the same detection performance as the known case with no time gaps may be reduced by at least 2 or 3 orders of magnitude relative to its value $T_{frame}/32$ (valid for the case of non optimized receiver, as discussed above). Hence, with an optimized receiver, a time gap duration $T_{gap}$ of at least 0.003%-0.03% (corresponding to 4-40 nanoseconds, if $T_{frame}=125$ μs) provides detection performance equal to or better than the known case with no time gap, all the other conditions (namely, bit rates $R_C$, $R_D$, powers $P_C$, $P_D$ and modulation format) being equal.

On the other hand, assuming that only the reduction of the activation time is pursued, keeping a time gap duration $T_{gap}$ higher than $T_{frame}/32$ allows multiplying the bitrate $R_C$ of the activation signal AS by 2 or 3 orders of magnitude relative to its value providing acceptable detection performance with a non optimized receiver. Hence, the bitrate $R_C$ of the activation signal may be increased to hundreds or even thousands of bits per second, while keeping an acceptable penalty of about 0.2 dB on the upstream signals generated by the already active ONUs. For instance, with an acceptable penalty of 0.2 dB on the data channel, with $T_{gap}=18$ μs and an optimized receiver, a bitrate $R_C$ of the activation signal AS equal to 1 kbit/s can be reached.

In general, the advantage provided by use of an optimized receiver may be used in part for reducing the time gap duration $T_{gap}$ relative to its minimum value obtained when a non optimized receiver is used, and in part for increasing the bitrate $R_C$ of the activation signal AS relative to its maximum value achievable when a non optimized receiver is used. In particular, the bitrate $R_C$ is increased to a value preferably comprised between 200 bps and 200 kbps, more preferably between 500 bps and 50 kbps, even more preferably between 1 kbps and 5 kbps.

With such high bitrates, the activation time of the new ONU 316 is greatly reduced, since the activation information carried by the activation signal AS are received and detected by the receiver of the OLT 100 in a quite short time, e.g. less than one minute taking also into account the need for multiple trials (namely, multiple iterations of step 405 shown in FIG. 2) to tune onto the expected upstream channel and also the event of collisions generated by other ONUs trying to activate at the same time on the same wavelength. For example, transmission of a 32 byte serial number of the ONU 316 may require up to about 1 second. Even if transmission of the serial number must repeated several times (because the ONU 316 is not transmitting on the expected upstream channel, or because it collides with other ONUs attempting activation), the complete activation procedure may be completed in up to the order of a minute, in the worst case.

The increase of the bitrate $R_C$ also allows increasing the amount of activation information carried by the activation signal AS. For instance, besides carrying the identifier of the ONU 316, the control signal may also carry status information or control information from the ONU 316 to the OLT 100.

It shall be noticed that, though the above calculations for both non optimized receiver and optimized receiver are based on the assumption that the upstream traffic has a framed structure with frame period $T_{frame}$, similar calculations may be made also for other embodiments where the upstream traffic transmitted by the already active ONUs has not a periodic framed structure (namely, wherein no frame period $T_{frame}$ may be defined). In such cases, the preferred values and ranges for $T_{gap}$ may be expressed (instead of in term of $T_{gap}/T_{frame}$) in terms of percentage of the overall capacity originally available on the upstream channel λu2 which is taken away from transmission by the ONUs already active of the upstream channel λu2 and which is dedicated to reception of the activation signal AS.

The method according to embodiments of the present invention, therefore, advantageously solves the problem of collisions which might arise during the activation of an ONU with a non-calibrated tunable transmitter by using a low level, low frequency activation signal combined with time gaps for the detection of the activation signal. Though the activation signal is a low level signal, use of time gaps greatly improves its detection conditions at the OLT, thereby allowing to increase the bitrate of the activation signal to such an extent that makes this technique practically feasible. Moreover, the method described allows fully exploiting the advantage of using a narrow-bandwidth (and hence low-noise) dedicated trans-impedance amplifier to detect the LL-LF activation signal because, thanks to detection during the time gaps, the detection performance is not limited by the noise caused by the presence of other active ONUs on the same upstream channel (as is the case for known LL-LF techniques), but by the intrinsic noise of the dedicated trans-impedance amplifier. On the other hand, no synchronization of the time gaps between the various upstream channels is required, because the activation signal is a low level signal, and accordingly it may be superimposed to pre-existing upstream signals substantially without impairing their reception.

The invention claimed is:

1. A method for activating an optical network unit on an upstream channel of a multi-wavelength passive optical network, the multi-wavelength passive optical network including an optical line termination and a number of further optical network units for transmitting upstream signals to the optical line termination on multiple upstream channels including the upstream channel, the method comprising:
   a) during transmission of the upstream signals on the multiple upstream channels, transmitting an activation signal from the optical network unit to the optical line termination, the activation signal having an optical power lower than optical power of each one of the upstream signals;
   b) during at least one time gap having a time gap duration $T_{gap}$, suspending transmission of the upstream signals on the upstream channel; and
   c) during the at least one time gap, if the activation signal is transmitted on the upstream channel, detecting the activation signal at the optical line termination.

2. The method according to claim 1, wherein the optical power is at least 28 dB below a sensitivity of a receiver by which the optical line termination receives the upstream signals transmitted to the optical line termination on the multiple upstream channels.

3. The method according to claim 1, wherein at the a) the activation signal has a bitrate lower than a bitrate of each one of the upstream signals transmitted by the further optical network units on the multiple upstream channels.

4. The method according to claim 3, wherein the bitrate of the activation signal is between 200 bps and 200 kbps and the bitrate of each one of the upstream signals transmitted by the further optical network units is higher than 100 Mbps.

5. The method according to claim 1, wherein the b) comprises suspending the transmission of the upstream signals on the upstream channel during multiple time gaps.

6. The method according to claim 5, wherein the multiple time gaps comprise a single time gap per each upstream frame carrying portions of the upstream signals transmitted on the upstream channel.

7. The method according to claim 6, wherein inverse of a time lapsing between start of two consecutive time gaps of the multiple gaps is an integer multiple of a bitrate of the activation signal.

8. The method according to claim 1, wherein the c) further comprises sending a feedback signal from the optical line termination to the optical network unit if at the c) the optical line termination detected the activation signal and properly read and processed activation information carried by the activation signal.

9. The method according to claim 8, wherein the a) comprises transmitting the activation signal in a substantially continuous way until a predefined time has expired or until the feedback signal is received at the optical network unit.

10. The method according to claim 9, wherein, if no feedback signal is received before the predefined time has expired, the optical network unit changes transmission wavelength and transmits again the activation signal.

11. The method according to claim 1, wherein the b) further comprises suspending transmission of the upstream signals also on upstream channels other than the upstream channel.

12. A method for activating an optical network unit on an upstream channel of a multi-wavelength passive optical network, the multi-wavelength passive optical network including an optical line termination and a number of further optical network units for transmitting upstream signals to the optical line termination on multiple upstream channels including the upstream channel, the method comprising:
 a) during transmission of the upstream signals on the multiple upstream channels, transmitting an activation signal from the optical network unit to the optical line termination, the activation signal having an optical power lower than optical power of each one of the upstream signals;
 b) during at least one time gap having a time gap duration $T_{gap}$, suspending transmission of the upstream signals on the upstream channel; and
 c) during the at least one time gap, if the activation signal is transmitted on the upstream channel, detecting the activation signal at the optical line termination, wherein the time gap duration $T_{gap}$ is shorter than $2 \cdot T_{frame}$, wherein $T_{frame}$ is a frame period of the upstream signals transmitted on the upstream channel.

13. The method according to claim 1, wherein the activation signal is received at the optical line termination by a receiver having a bandwidth between 75% and 100% of a bitrate of the activation signal.

14. The method according to claim 13, wherein the time gap duration $T_{gap}$ is longer than a minimum value between $T_{frame}/300000$ and $T_{frame}/15000$, wherein $T_{frame}$ is a frame period of the upstream signals transmitted on the upstream channel.

15. A multi-wavelength passive optical network comprising:
 an optical line termination;
 an optical network unit to be activated on an upstream channel of the multi-wavelength passive optical network; and
 a number of further optical network units configured to transmit upstream signals to the optical line termination on multiple upstream channels including the upstream channel;
 wherein the optical network unit is configured to transmit an activation signal to the optical line termination during transmission of the upstream signals on the multiple upstream channels, the activation signal having an optical power lower than the optical power of each one of the upstream signals; and
 wherein the optical line termination is configured to, during at least one time gap having a time gap duration $T_{gap}$, suspend transmission of the upstream signals on the upstream channel and, if the activation signal is transmitted on the upstream channel, detect the activation signal during the at least one time gap.

16. The multi-wavelength passive optical network of claim 15, wherein the time gap duration $T_{gap}$ is shorter than $\lambda \cdot T_{frame}$, wherein $T_{frame}$ is a frame period of the upstream signals transmitted on the upstream channel.

17. The multi-wavelength passive optical network of claim 15, wherein the time gap duration $T_{gap}$ is longer than a minimum value between $T_{frame}/300000$ and $T_{frame}/15000$, wherein $T_{frame}$ is a frame period of the upstream signals transmitted on the upstream channel.

18. The multi-wavelength passive optical network of claim 15, wherein the optical line termination is configured to suspend the transmission of the upstream signals on the upstream channel during multiple time gaps.

19. The multi-wavelength passive optical network of claim 18, wherein the multiple time gaps comprise a single time gap per each upstream frame carrying portions of the upstream signals transmitted on the upstream channel.

20. The multi-wavelength passive optical network of claim 19, wherein inverse of a time lapsing between start of two consecutive time gaps of the multiple gaps is an integer multiple of a bitrate of the activation signal.

* * * * *